Oct. 29, 1929.  F. COWAN  1,733,581
FILM FRAME APPARATUS
Filed Oct. 30, 1928  2 Sheets-Sheet 1

Fletcher Cowan
INVENTOR
BY W. F. Bissing.
ATTORNEY

Oct. 29, 1929.　　　　F. COWAN　　　　1,733,581
FILM FRAME APPARATUS
Filed Oct. 30, 1928　　　　2 Sheets-Sheet 2
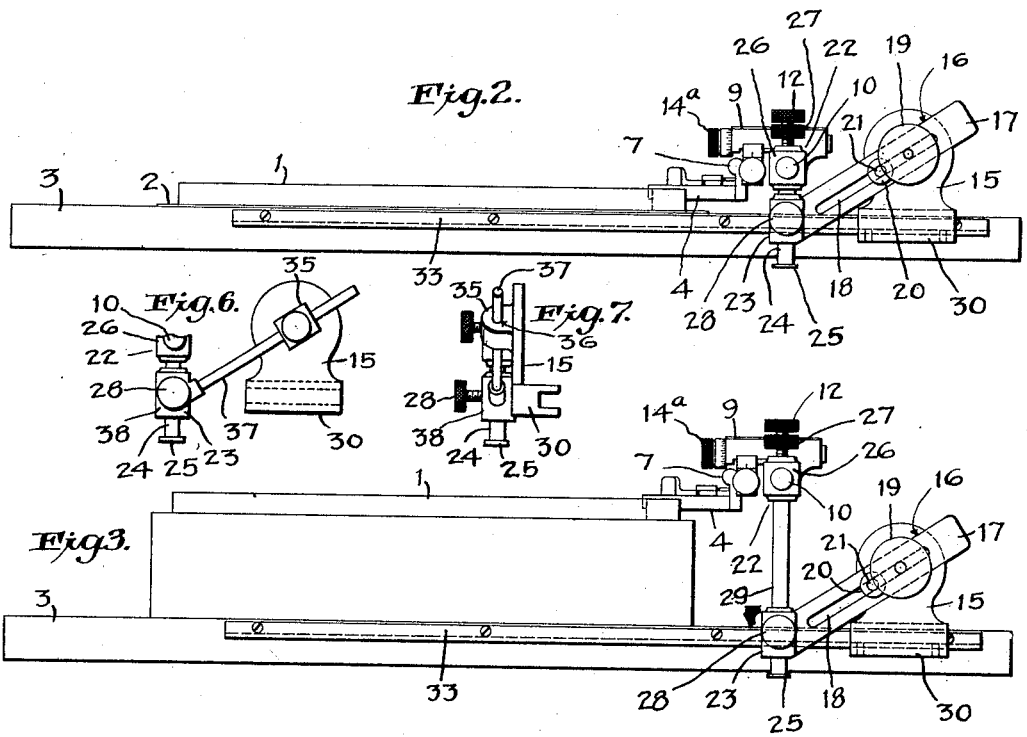
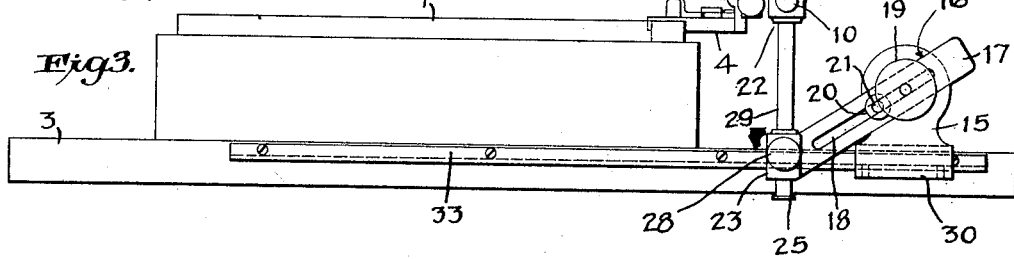
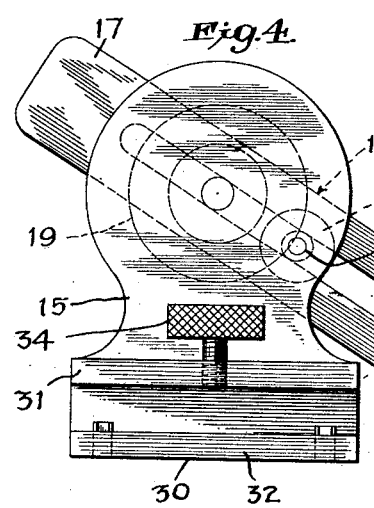
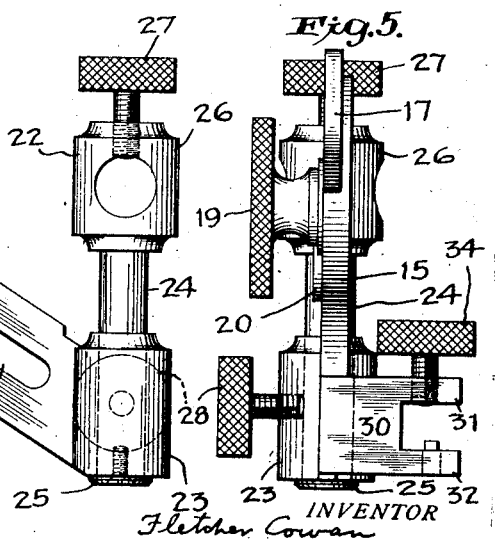

Patented Oct. 29, 1929

1,733,581

UNITED STATES PATENT OFFICE

FLETCHER COWAN, OF SUMMIT, NEW JERSEY, ASSIGNOR TO BEN DAY, INC., A CORPORATION OF NEW JERSEY

FILM-FRAME APPARATUS

Application filed October 30, 1928. Serial No. 316,091.

My invention relates to improvements in film frame apparatus used in connection with what are known in the printing art as printing or "shading" films, for printing on drawing surfaces of cardboard, stone, metal or other material, and more particularly to improved means for securing a fine, precisional adjustment of the shading film with relation to the work, always maintaining the film level so that all portions of the pattern can be transferred to the cardboard, zinc or copper plate or to the lithographic stone.

One of the objects of the invention is to provide a film frame apparatus having means including a pair of inclined tracks and slides and vertically adjustable standards for securing a synchronous and fine precisional adjustment of the printing film with relation to the work and keeping the film level on the work.

Another object of the invention is to provide means for mounting and freely moving the slides and standards at an incline with relation to the work table, and for mounting the standards, supporting the crossbar, outside of the working surface of the work table or drawing board, so as to provide a film frame apparatus capable of a full range of movement from side to side, fore and aft and vertically.

Another object is to provide a film frame apparatus whose parts are so constructed and arranged that any tendency toward binding or gagging of the standards supporting the crossbar or of the inclined slides, is avoided, the parts of the apparatus being capable of smooth, synchronous movement so as to affect the desired accurate leveling adjustment of the shading film and to provide an apparatus whose parts are readily accessible and easily and accurately manipulated.

With the above and other objects in view, my invention consists in the parts, improvements and combinations more fully pointed out hereinafter.

Referring now to the drawings:

Figure 2, is a side view of the apparatus shown in Figure 1.

Figure 3, is a side view showing the apparatus ready for use upon a drawing on a lithographic stone.

Figure 4, is a side elevation of one of the supporting members, with its inclined track and slide and adjustable standard.

Figure 5, is a front detail view of a supporting member showing the various clamping devices.

Figure 6, is a detail side elevation of a modified form of the invention, and

Figure 7, is a rear view of the form shown in Figure 6.

Figure 1:
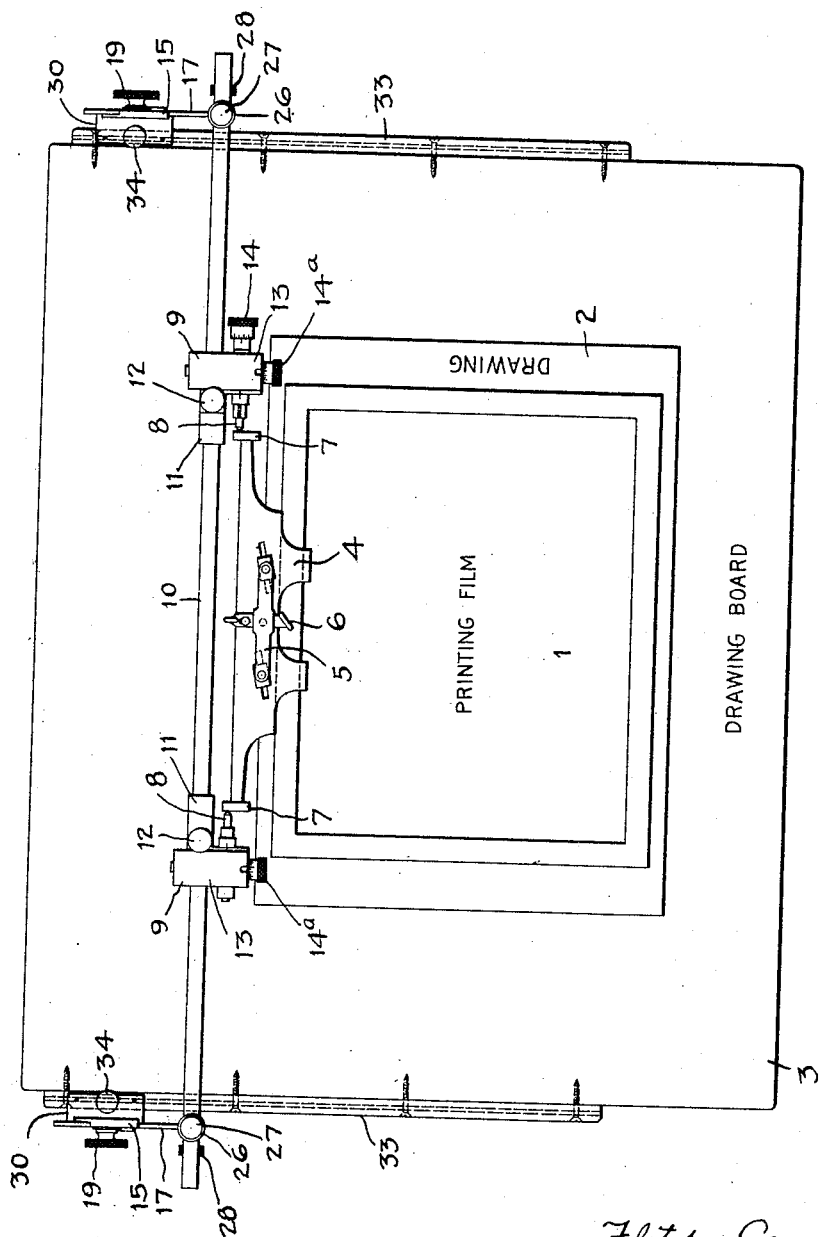
Figure 1, is a plan view of a film frame apparatus in position for use with a cardboard drawing.

The film frame apparatus of my invention, it will be understood, may be used when printing on drawing surfaces on cardboard, metal, stone or other material.

In Figures 1 and 2 of the drawings, the invention is shown when used with a cardboard drawing. The printing film 1, is shown in place over the drawing 2, on a worktable or drawing board 3. The film is held by the usual frame clamp 4, whose jaws, operated by the lever and link connection 5, 6, grasp the film. The clamp 4, is provided with ears 7, which are socketed to engage pintles 8 of the micrometric pintle holder devices 9.

The pintle holder devices 9, are supported on a crossbar 10 by means of their sleeves 11, and are clamped in place on the bar by means of thumb screws 12. Forwardly projecting bearing blocks 13, carry the pintles, which are suitably adjusted laterally by means of adjusting screws 14, and longitudinally of the table by means of adjusting screws 14$^a$, which screws carry the usual micrometric gage markings.

The ears 7 of the clamp are so flared or protuberated that they bear against the sleeves 11 of the pintle holder devices and act as a backrest for the frame clamp, when the clamp and printing film are turned about the pintles 8, so that the progress of the work may be inspected. The ears, acting as backstops, serve to prevent injury to the sensitive film by holding the film from contact with any of the parts of the apparatus.

In accordance with my invention, means are provided including a pair of inclined slides, for securing a fine, precisional adjustment of the film to the drawing level.

As illustrated, a pair of supporting members 15, are provided. In the form of the invention shown in Figures 1 to 5, the upper portion of each supporting member is provided with an inclined track at 16, each of which is adapted to carry a reciprocating slide 17. Each slide 17, as shown, is provided at 18, with a longitudinally elongated slot. An outwardly projecting large thumbscrew 19, carried by each supporting member is provided for clamping the slides in any of their adjusted positions. A cap 20, secured by screw 21, the latter passing through the slot in the slide, is provided for holding each slide in place on its track, when the associated thumbscrew 19 is loosened. Or the slides may be suitably beveled so that they may be held in place within their grooves.

Means are provided, in accordance with the invention, for securing an adjustment of the printing film with relation to the reciprocating slides and the surface to be printed upon.

Suitably secured to the lower end of each slide 17 is an adjustable standard 22, in which standards the crossbar, which carries the pintle holders, film clamp, frame and film, is mounted.

It will be seen, that by loosening thumbscrews 19, the crossbar may be moved so as to position the printing film as desired.

When the film is to be brought into registering relation with the drawing to be worked, it is essential that its adjustment be effected with ease and without marring of the drawing, such as might happen by binding, sticking or jerking of any of the adjusting members, or any sharp vertical drop of the members.

When rod 10, carrying the frame and film is moved after loosening thumbscrews 19, the slides 17, carrying the standards 22, may be moved smoothly and synchronously without binding, in their inclined tracks of the supporting members, and the standards do not drop vertically but are firmly held in their adjusted position. This inclined movement of the slides moves the standards so as to avoid any sharp vertical drop and brings about a fine, precisional adjustment of the printing film to the drawing level.

The inclined slides are of a length sufficient to permit their movement to bring about the desired positioning of the shading film on drawings of different heights.

Means are provided, in accordance with the invention, for securing a separate vertical adjustment of the shading film.

As illustrated, each standard 22, comprises a tubular base 23, suitably secured to its respective slide 17, and a vertically adjustable shank 24. Each shank passes through its base 23, the opening in the latter being of greater diameter than the shank so that the shank is freely rotatable in its base. Each shank, at its bottom, may be provided with a cap 25, or suitably flattened to hold it in its base, and each shank, at its top, has an enlarged portion 26, each having an aperture adapted to receive one end of crossbar 10. Set screws 27, pass through the tops of the shanks and serve to removably clamp the bar in the shanks. The shanks 24 may be moved vertically with relation to their base portions, and thumbscrews 28, passing through the base portions serve to removably clamp the shanks in any of their vertically adjusted positions.

If the drawing to be worked is on a material of substanitial heights, the shanks 24, may first be raised vertically, so as to raise the crossbar and shading film above the work, and then clamped in their adjusted position. The thumbscrews 19, for the slides, may then be loosened, so that the slides may move the standards at an incline to the drawing surface to secure the final precisional adjustment of the film to the drawing level.

Or, as shown in Figure 3, when working on a drawing on stone of considerable height, vertically adjustable shank 29, of greater length may be substituted for the shanks 24, shown in Figures 1 and 2.

The shanks being freely adjustable and rotatable in their bases permits their adjustments to be made without any binding action, and enables the shanks to be turned about so that the crossbar may be easily inserted or withdrawn, when assembling or detaching the apparatus, or permits the shanks to be veered and fixed in angular position to the board, when desired.

Means are provided, in accordance with the invention, for mounting the supporting members, the inclined reciprocating slides and the adjustable standards outside the working surface of the drawing board so that the slides may travel in their tracks and in standards may be moved vertically and at an incline to the work without interference by the drawing board or by the supporting members thus giving a full range of movement to the apparatus.

As shown, the ends of slides 17, to which the standards are secured, project beyond the supporting members so that the standards are supported outside the supporting members, and may be moved at an incline with relation to the work and may be adjusted vertically without interference by the supporting members. In the form shown, each supporting member 15, is provided with an inwardly extending base portion 30, having upper and lower lips 31, 32, which form a groove for each supporting member, which is adapted to slidingly engage a grooved guide or track 33, provided along each side of the work table. Thumbscrews 34, one for each supporting member, pass through the lips 31, and engage the guides 33, so as to removably secure the supporting members in place. The movement of the supporting members along the guides avoids any uncertain leveling of the devices on the table or drawing board.

In the modified form of the invention shown in Figures 6 and 7, each of the supporting members 15, is provided with an inclined lug 35, each having a track or bore 36 extending therethrough. Mounted in the lugs and adapted to travel on the tracks of the lugs, are a pair of slides 37. Each slide 37, is suitable secured to its respective standard 22, as by means of the cast socket connection 38, shown.

The combination of the standards, which may themselves be adjusted vertically, and the inclined tracks and slides for moving the standards at an incline to the work table allows the film to be positioned on the drawing rapidly and accurately with a minimum of movement of the adjusting members and without any gaging or binding or sharp vertical drops of the adjusting members.

The provision of means for clamping the supporting members to the table, for clamping the slides in their adjusted positions, for clamping the shanks of the standards in position, and for clamping the crossbar in the standards, enables the apparatus to resist any movements due to working pressures or other causes and will avoid shifting of the apparatus on the drawing.

In operation, the apparatus of my invention may be rapidly assembled and detached, and is capable of a full range of movement from side to side, fore and aft and of a fine, precisional vertical adjustment of the film with relation to the drawing.

The supporting members 15, are first placed on the guides of the drawingboard and the bar 10, carrying the film frame clamp and film, if a drawing on cardboard or metal is to be worked, is inserted between the pintle holders, which have been suitably adjusted on the crossbar. The precisional adjustment of the film to the drawing level may then be brought about by loosening thumbscrews 19. Bar 10 may be then moved, by means of the inclined slides and the standards smoothly and synchronously, to the desired position, and the slides and standards are then held in their proper position by tightening the thumbscrews 19. If a drawing on a lithographic stone, for example, is to be worked, the shanks of standards 22, carrying the bar, are first adjusted vertically to secure a preliminary positioning of the film and then clamped in place, before the film clamp, frame and film are inserted between the pintles, and before the movement of the slides and adjustment of standards described above, has taken place.

After the proper accurate adjustment of the film to the drawing level has been effected, the inked design or texture of the printing film is transferred to the drawing where desired by the proper printing or pressing instrument.

Having thus described the invention, it will be understood that changes may be made in carrying out the invention without departing from the principle thereof.

What I claim is:

1. A film frame apparatus for printing films including in combination with a worktable adapted to support the work, a pair of supporting members secured to the table, a pair of inclined reciprocable slides carried by the supporting members, a pair of standards secured to said slides and adapted to be moved thereby at an incline to the work table and a crossbar carried by said standards, said crossbar adapted to support a printing film frame.

2. A film frame apparatus for printing films including in combination with a worktable adapted to support the work, a pair of supporting members secured to and extending from the table, a pair of inclined reciprocable slides carried by the supporting members, a pair of standards secured to said slides, said standards being vertically adjustable, and a crossbar carried by said standards, said crossbar adapted to support a printing film frame.

3. A film frame apparatus for printing films including in combination with a worktable adapted to support the work, a pair of supporting members secured to, and extending from the table, a pair of vertically adjustable standards, means carried by said supporting members for moving the standards at an incline to the work table, and a crossbar carried by said standards and adapted to support a printing film frame.

4. A film frame apparatus for printing films including in combination with a worktable, a pair of supporting members, a pair of inclined reciprocable slides carried by said supporting members, a pair of standards mounted outside of said supporting members and outside of the work table and secured to said slides, the standards being adapted to be moved by said slides at an incline to the work table, and a crossbar carried by said standards and adapted to support a printing film frame.

5. A film frame apparatus for printing films including in combination, a pair of supporting members, said supporting members being each provided with an inclined track, a pair of reciprocable slides carried by said supporting members and adapted to travel on said tracks, a pair of standards secured to said slides and a crossbar carried by said standards and adapted to support a printing film frame.

6. A film frame apparatus for printing films including in combination, a pair of supporting members, said supporting members being each provided with an inclined track, a pair of reciprocable slides carried by said supporting members and adapted to travel on said tracks, a pair of vertically adjustable standards secured to said slides, and a crossbar carried by said standards, and adapted to support a printing film frame.

7. A film frame apparatus for printing films including in combination, a pair of supporting members, a pair of inclined, reciprocable slides carried by said supporting members, a pair of adjustable standards secured to said slides, said slides being each provided with a longitudinally elongated slot, and means carried by the supporting members passing through the slots in the slides for securing the slides to the supporting members.

8. A film frame apparatus for printing films including in combination, a pair of supporting members, a pair of inclined reciprocable slides carried by said supporting members, a pair of adjustable standards secured to said slides, and means for removably clamping said slides in any of their moved positions.

9. A film frame apparatus including in combination a pair of supporting members, a pair of reciprocable slides carried by said supporting members, a pair of standards secured to said slides, a crossbar adapted to support a printing film frame, carried by said standards, said standards being vertically adjustable, and means for clamping the standards in their vertically adjusted position.

10. A film frame apparatus including in combination, a pair of supporting members, a pair of reciprocable slides carried by said supporting members, a pair of standards secured to said slides, a crossbar adapted to support a printing film frame, carried by said standards, said standards being vertically adjustable, means for clamping the standards in their vertically adjusted positions and means for clamping the crossbar in the standards.

11. A film frame apparatus for printing films including in combination with a worktable adapted to support the work, and provided with a guide at each side thereof, a pair of supporting members, each supporting member being provided with an inwardly extending, grooved base portion adapted to slidingly engage said guides, a pair of inclined reciprocable slides carried by said supporting members, a pair of vertically adjustable standards secured to said slides and a crossbar carried by said standards.

12. A film frame apparatus for printing films including in combination, a pair of supporting members, a pair of inclined, reciprocable slides carried by said supporting members, a pair of adjustable and rotatable standards mounted outside of said supporting members and secured to said slides, and a crossbar carried by said standards and adapted to support a printing film frame.

In testimony whereof, I have signed my name to this specification.

FLETCHER COWAN.